United States Patent [19]

Thunnissen

[11] Patent Number: 4,967,894
[45] Date of Patent: Nov. 6, 1990

[54] RETRACTABLE ROLLER SYSTEM WITH REMOVABLE CARRIER

[75] Inventor: Kees W. Thunnissen, Nuenen, Netherlands

[73] Assignee: Ancra International Corporation, Hawthorne, Calif.

[21] Appl. No.: 320,017

[22] Filed: Mar. 7, 1989

[51] Int. Cl.⁵ ................................................ B60P 1/00
[52] U.S. Cl. .................................................. 193/35 SS
[58] Field of Search ............... 104/135, 48; 193/35 A, 193/35 C, 35 SS; 198/781, 782

[56] References Cited

U.S. PATENT DOCUMENTS 4,089,399  5/1978  Webb ............................... 193/35 SS
4,823,927  4/1989  Jensen ............................. 193/35 SS

FOREIGN PATENT DOCUMENTS 0099555  8/1964  Norway ........................... 193/35 SS Primary Examiner—Robert J. Oberleitner
Attorney, Agent, or Firm—Helfgott & Karas

[57] ABSTRACT

A roller track comprises a series of rollers having their axes positioned mutually parallel and transverse to the longitudinal direction of the series. The roller are rotatably journalled in an elongated carrier which is received in a U-channel which is closable at its open upper side by a cover plate which may be secure to the upper edges of the section flanges. The carrier with the rollers is movable vertically between a lower position, in which the rollers are completely sunk in the housing, and an upper or operative position, in which the rollers extend by a fraction of their diameter through corresponding apertures in the cover plate. The operative position is upwardly limited in that at both sides of the carrier, portions of the carrier abut from below against inwardly projecting flange portions of the channel. At least one of the upright flanges of the channel has an outer portion which is fixedly connected with a channel web and an inner portion, normally in engagement with the outer portion from the inside thereof and coupled therewith in the vertical direction. The inner portion is constructed such that it can, in the lowermost position of the roller carrier and, with the cover plate removed, inwardly tilted about its lower edge supported in the corner between the outer portion and the channel web so that the inner portion will be disconnected from the outer portion and removed.

4 Claims, 2 Drawing Sheets

RETRACTABLE ROLLER SYSTEM WITH REMOVABLE CARRIER

BACKGROUND OF THE INVENTION

The present invention relates to a roller track comprising a series of rollers having their axes positioned mutually parallel and transverse to the longitudinal direction of the series. The rollers are rotatably journalled in an elongated carrier which is received in a channel or U-shaped section which is closable at its open upper side by a cover plate. The latter may be secured to the upper edges of the section flanges, the carrier with rollers being movable vertically between a lower position in which the rollers are completely sunk in the housing and an upper or operative position in which the rollers extend by a fraction of their diameter through corresponding apertures in the cover plate. The upper position may be upwardly limited.

Such roller tracks are known and are applied a.o. in loading floors of e.g. trucks adapted for container transport. The roller carrier is generally constituted by an inner channel section supported by one or more inflatable air hoses extending in the longitudinal direction along the bottom or web of the outer channel section, while the projections are formed by wings which are outwardly directed from the upright flanges of the inner section, said wings being pushed, when the air hoses are inflated, against the lower surfaces of the enlargements of the flange edges of the outer channel section, which at least in the transverse direction is integral.

A disadvantage of the known roller track is that the insertion and removal respectively of the roller carrier into and from the outer channel section must take place from a longitudinal end of the outer channel section. It has to be taken into account that the roller tracks generally have a length of many meters and that the roller carrier generally is assembled from a (large) number of short sections; if in such a case a roller carrier section has to be removed for repair or replacement, usually many if not all sections have to be slid in the longitudinal direction from the end of the outer channel section.

SUMMARY OF THE INVENTION

The invention aims at removing this disadvantage without deteriorating the stability of the rollers in their operative positions, which is obtained through the co-operation between the carrier projections and the flange enlargements.

This aim is achieved according to the invention in that at least one of the upright flanges of the channel section comprises an outer portion fixedly connected with the channel web and an inner portion, normally in engagement with the outer portion from the inside thereof and coupled therewith in the vertical direction. The inner portion includes said inwardly projecting flange portion, the construction being such, that the inner portion may, in the lowermost position of the roller carrier and with the cover plate removed, inwardly tilted about its lower edge supported in the corner between the outer portion and the channel web so that said portion will become disconnected from the outer portion and thus may be removed.

Upon the removal of the cover plate and the inner upright flange portion, the roller carrier section, which is to repaired or replaced respectively, may be readily removed vertically from the channel section, while the remaining sections of the roller carrier may be left in place.

Preferably, the inner portion of the upright flange engages with its lower edge in a groove formed in the channel web beside the outer portion of the upright flange, the inner portion being beveled at its outer side from a point at some distance over the lower edge towards said lower edge.

The invention is further explained below with reference to the drawing of an embodiment given as an example.

DETAILED DESCRIPION OF THE PREFERRED EMBODIMENT

Figure 1:
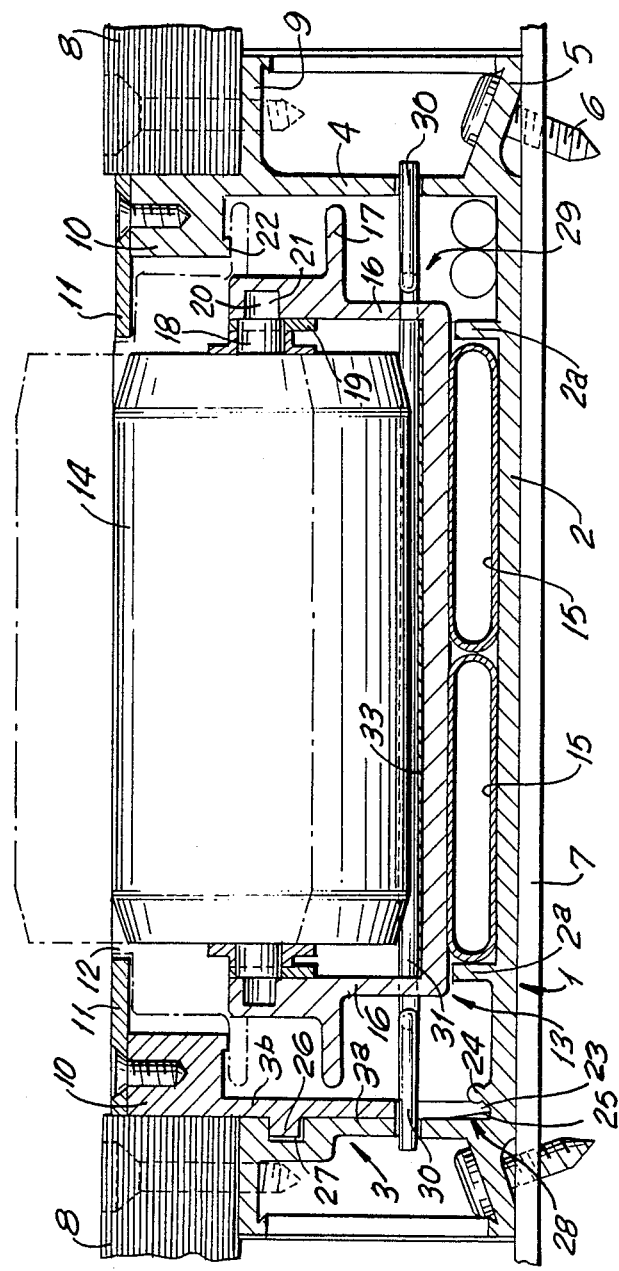
FIG. 1 shows a transverse section through the roller track according to the invention.
Figure 2:
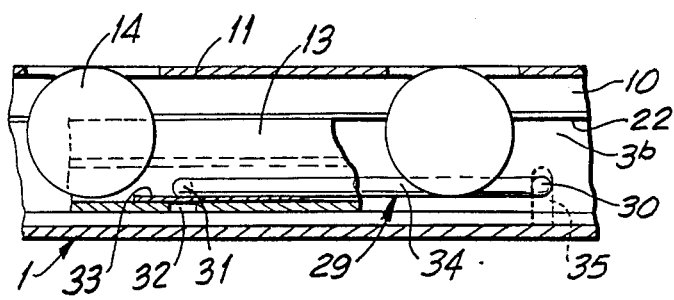
FIGS. 2 and 3 respectively show a vertical and a horizontal longitudinal section of the roller track.
Figure 3:
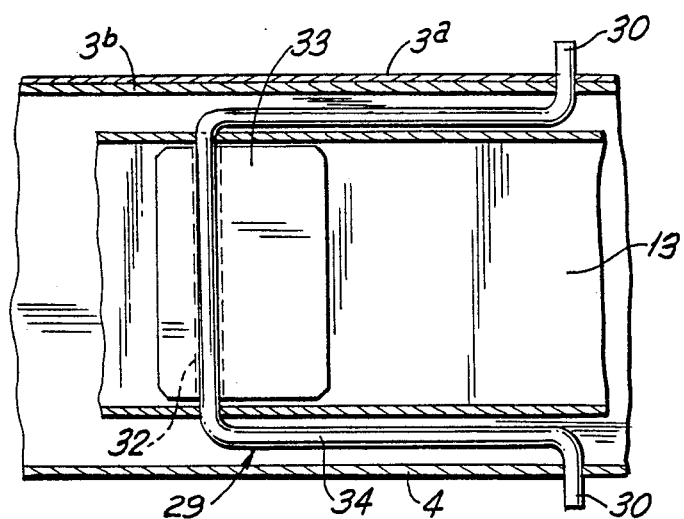

Reference number 1 denotes an outer channel having a generally U-shaped cross- with a section web or bottom 2 and upright side walls 3 and 4. The channel 1 is secured through laterally directed mounting flanges 5 and screws 6 to a lower structure 7 of e.g. the loading floor of a truck adapted for container transport. The wooden parts 8 of the loading floor proper are supported by supporting flanges 9 which extend laterally from the side walls 3 and 4 respectively. The side walls 3 and 4 have inwardly extending enlarged portions 10 at their upper edges. The channel 1 is covered at its upper side with a cover plate 11 which is secured through screws on the enlarged flange portions 10 and provided with a series of rectangular apertures 12 for (partially) passing rollers 14 there through which will be described below.

A carrier or tray 13 for the rollers 14 which is substantially in the shape of a U-shaped channel is received in the outer channel 1. The carrier 13 is supported by two air hoses 15 provided on the bottom 2 of the outer channel 1, which are laterally enclosed between two ribs 2a. The upright walls 16 of the carrier or tract 13 have outwardly directed flange members or ledges 17. The shafts 18 of the rollers 14 are mutually connected by coupling strips 19 which therefore are provided with holes at the desired pitch corresponding to the pitch of the apertures 12 in the cover plate 11. The shaft ends 20 are laterally flattened and received in longitudinal grooves 21 provided in the inner surface of the upright walls 16.

The drawing shows the roller track with the roller carrier 13 in its lowermost position in which the rollers 14 are completely sunk with reference to the upper surface of the loading floor. By inflating the air hoses in known manner, however, the carrier 13 may be placed in an upper end position in which the rollers 14 extend some distance through the apertures in the cover plate 11 to beyond the level of the loading floor. In this position a load, particularly a container, may be easily moved along the loading floor. The upper end position is limited in that the flange members 17 abut the lower surfaces 22 of the enlarged portions 10, which serve as the abutment surfaces. In order to permit the removal of the carrier 13 with the rollers 14, when the cover plate 11 has been removed, in the vertical direction, e.g. for repair, replacement or inspection, the upright side wall 3 of the channel 1 has two parts or portions 3a and 3b. The outer portion 3a is integral with the channel bottom 2 and the supporting flange 9, whereas the inner portion 3b carries the enlarged portion 10 and removably engages the outer portion 3a. The inner portion 3b engages with its lower edge 23 in a groove 25 formed between the fixed upstanding flange portion 3a and a ridge or rib 24 extending upwardly from the bottom 2. In the operative position shown in the drawing the inner portion 3b engages with a nose or projection 26 thereof in a corresponding recess 27 of the outer portion 3a so that both portions are vertically coupled or fixed to each other. The the cover plate 11 keeps the portion 3b in its vertical position. Furthermore, the inner portion 3b slightly beveled or tapered at the lower end thereof at 28 so as to pemit the inner portion 3b to tilt somewhat inwardly and become released from portion 3a, after the cover plate 11 has been removed, so that it may be taken from the channel 1. Thereby the necessary clearance in the transverse direction is obtained, which allows removal of the carrier 13 from the channel 1.

The channel 1 as shown is characterized by a relatively large torsional rigidity and may be fabricated in a relatively simple manner as an extruded aluminum channel of length of e.g. 12 m. The carrier or tray 13 and the inner portion 3b are preferably constructed in shorter lengths.

Furthermore, the roller carrier 13 is locked in a special manner against undesirable shifting in the longitudinal direction relative to the channel 1, while the above described removal of the carrier is not essentially interfered with by it.

The locking means is constituted by a generally U-shaped bracket or brace 29. The ends 30 of the bracket 29 are journalled as fulcrums in corresponding apertures in the upright side walls 3, 4 of the channel 1. The portion 3b has at the position of the respective bracket end a vertical slot 35 to allow the above-described vertical 13 removal of that portion. The web 31 of the bracket 29 is engaged with the carrier 13, through a transverse slot 32 in the bottom of the carrier 13 and is kept in its operative position by a small sheet 33 entered between the lower side of the bracket web 31 and the upper side of the bottom of the channel.

The points of engagement of the bracket 29 with the channel 1 and the carrier 13 are chosen such that legs 34 of the bracket 29 in the average take a generally horizontal position.

It will be clear that after removal of the locking sheet 33 the carrier 13 may be taken from the channel 1 in the above described manner.

What is claimed is:

1. A roller track comprising an elongated carrier (13); a housing having a U-shaped channel (1), a series of rollers (14) having their axes positioned mutually parallel and transverse to the longitudinal direction of the series, said rollers being rotatably journalled in said elongated carrier which is received in said U-shaped channel, said channel having upright side walls (3,4) and a web portion (2) and being closable at an open upper side thereof by a cover plate (11) which may be secured to upper edges of said walls (3,4), said cover plate having apertures, said carrier with said rollers being movable vertically between a lower position in which the rollers are completely sunk in the channel and an upper operative position in which the rollers extend by a fraction of their diameter through respective apertures in the cover plate, said side walls (3,4) of said channel having inwardly projecting flanges (10), said carrier (13) having outwardly protruding portions (17), the upper position being upwardly limited at both sides of said carrier by said protruding portions (17) which abut in said upper position from below against said inwardly projecting flanges (10), at least one of the upright side walls of the channel including an outer portion (3a) fixedly connected with the web portion (2) of the channel and an inner portion (3b) which in assembly is in engagement with said outer portion (3a), said inner portion (3b) including said inwardly projecting flange (10); and means (23, 25) for connecting said inner portion (3b) to said outer portion (3a) so that in a lowermost position of the carrier (13) and with said cover plate (11) removed, the inner portion (3b) can be inwardly tilted about a lower edge thereof supported in a corner between the outer portion (3a) and the web portion (2) of the channel so that said inner portion (3b) will become disconnected from the outer portion (3a) and thus be removed.

2. A roller track according to claim 1, wherein a groove (25) is formed in said corner, the inner portion (3b) of the upright side wall (3) engaging with the lower edge thereof in said groove (25).

3. A roller track according to claim 2, wherein the inner portion (3b) of the upright side wall (3) is tapered at an outer surface (28) thereof starting at some distance from said lower edge.

4. A roller track according to claim 1, wherein the outer portion (3a) and the inner portion (3b) of the upright side wall (3) are provided with mutually engaging nose (26) and recess (27) formed at facing lateral surfaces of said inner and outer portions, respectively.

* * * * *